Nov. 20, 1923.                                              1,474,537
A. H. MANWARING
BRAKE
Original Filed Dec. 23, 1920
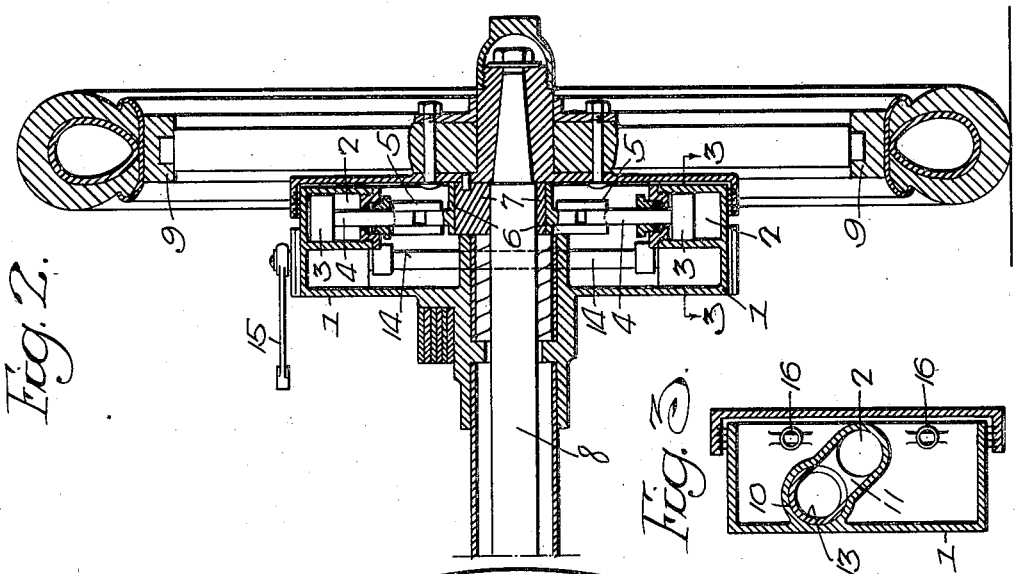
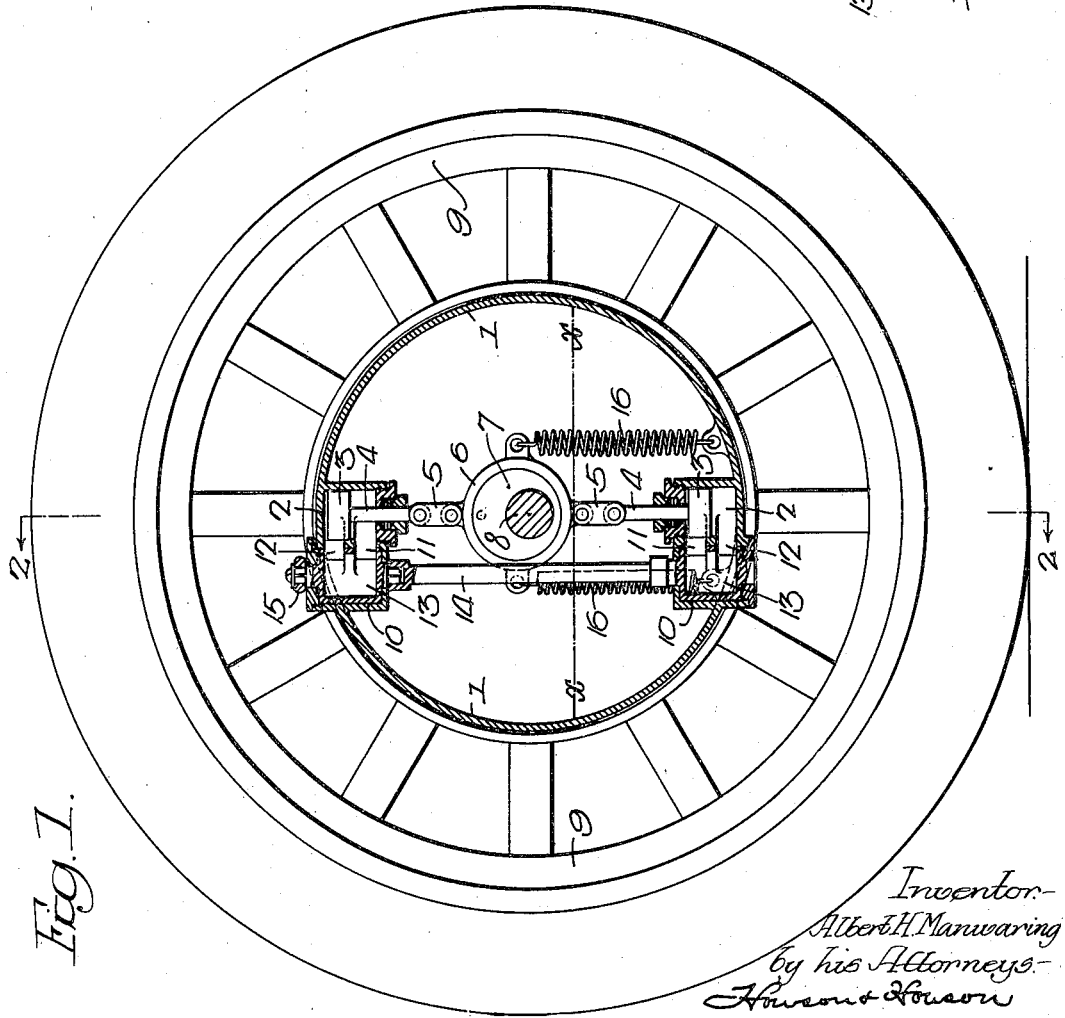
Inventor-
Albert H. Manwaring
by his Attorneys-
Howson & Howson Patented Nov. 20, 1923.

1,474,537

UNITED STATES PATENT OFFICE.

ALBERT H. MANWARING, OF NOBLE, PENNSYLVANIA, ASSIGNOR OF ONE-HALF TO ROY A. MANWARING, OF NOBLE, PENNSYLVANIA.

BRAKE.

Original application filed December 23, 1920, Serial No. 432,748. Divided and this application filed November 22, 1922. Serial No. 602,554.

*To all whom it may concern:*

Be it known that I, ALBERT H. MANWARING, a citizen of the United States, residing in Noble, Montgomery County, Pennsylvania, have invented a Brake (being a division of my application Serial No. 432,748, filed December 23, 1920), of which the following is a specification.

One object of this invention is to provide a simple, substantial and compact form of brake mechanism particularly adapted for use between an axle and the fixed frame of a motor vehicle, together with suitable controlling means for governing the operation of said mechanism.

These objects and other advantageous ends I attain as hereinafter set forth, reference being had to the accompanying drawings, in which, Fig. 1 is a transverse vertical section, illustrating my invention as utilized for braking a wheel;

Fig. 2 is a vertical section on the line 2—2, Fig. 1; and

Fig. 3 is a transverse section on the line 3—3, Fig. 2.

In the above drawings I have shown my invention employed as a braking device between an axle and the fixed frame of a motor vehicle. For this purpose I form a casing 1 integral with or connected to said frame and provide it with any desired number of cylinders 2. In each of these is mounted a piston 3 which, through a rod 4 and link 5, is operatively connected to the strap 6 of an eccentric 7 fixed to the driving axle or live shaft 8 on which is a motor vehicle wheel 9. As before, the opposite ends of the cylinder 2 are connected with a valve chamber 10 through ports 11 and 12, and the flow of fluid through these ports is controlled by a rotary valve 13 in said chamber.

In the present instance I have illustrated two cylinders 2 having their pistons both connected to a single eccentric and have likewise operatively connected the two rotary valves 13 by a rod or shaft 14, in addition connecting to one of said valves an arm 15 designed to be operated by any suitable brake-controlling mechanism whose detail construction forms no part of the present invention. In this case, as in that shown in my application No. 432,748, filed December 23, 1920, I provide a more or less yielding connection between the casing structure and the eccentric strap, which connection in the present form of the invention consists of a pair of springs 16 connected between oppositely projecting lugs on the strap 6 and similar lugs projecting inwardly from the cylindrical wall of the casing. By operating the arm 15, the valves connected thereto will be adjusted and vary the flow of liquid toward and from the cylinders 2. As a consequence, any desired braking or retarding force may be applied to the wheel 9 as the slip between the clutch members is varied.

It will be understood that in the present case I have omitted the fluid replenishing and safety valve attachments and have also shown the piston as solid instead of provided with a valve-controlled passage through its body. In any case however the cylinders and their associated valve chests and ports are normally filled with liquid, in addition to which the casing structure 1 likewise contains liquid such as oil, glycerine or the like, preferably to the level indicated by the line x—x.

I claim:

1. The combination in a brake of relatively fixed and rotatable members; a cylinder connected to one of said members; an eccentric connected to the other member; a piston driven by the eccentric and operative in the cylinder; and a yielding connection between the eccentric and the casing.

2. The combination in a brake of a rotary structure; a closed liquid-containing casing; a relatively fixed structure; a cylinder in the casing; a piston operative in the cylinder; a mechanical element actuated by the rotary member for reciprocating said piston; and an externally controlled valve mechanism for controlling the passage of liquid between the opposite ends of the cylinder.

3. The combination with a relatively fixed structure and a rotary wheel of a brake for said wheel comprising a liquid-containing casing; a cylinder in said casing; a piston operative in the cylinder; an eccentric connected to the wheel; means for actuating the piston from said eccentric; and valve mechanism for controlling the flow of fluid between the opposite ends of the cylinder when the piston is reciprocated.

4. The combination in a brake mechanism of a liquid-containing casing; a rotary eccentric member therein; a plurality of cylinders mounted in the casing; pistons operative in said cylinders respectively; means connecting said pistons with said rotary member; valves for controlling the flow of liquid between the cylinders and the casing; and a member common to said valves for simultaneously actuating them.

5. The combination in a brake of a liquid-containing casing; a rotary eccentric member in said casing; a plurality of cylinders mounted in the casing; pistons for said cylinders connected to said eccentric member; rotary valves respectively controlling the flow of liquid in the cylinders; and means for simultaneously adjusting said valves.

6. The combination in a brake of a liquid-containing casing; a rotary eccentric member in said casing; a plurality of cylinders mounted in the casing; pistons for said cylinders connected to said eccentric member; rotary valves respectively controlling the flow of liquid in the cylinders and mounted in axial alignment; a member operatively connecting the valves; and actuating means connected to one of the valves.

7. The combination in a brake of a liquid-containing casing; an eccentric in said casing; a strap for said eccentric; a plurality of cylinders in the casing; pistons for the cylinders respectively; means connecting the pistons with the eccentric; spring means yieldingly holding the eccentric in a definite position; and valve mechanism for controlling the flow of liquid in the cylinders.

ALBERT H. MANWARING.